Figure 7:
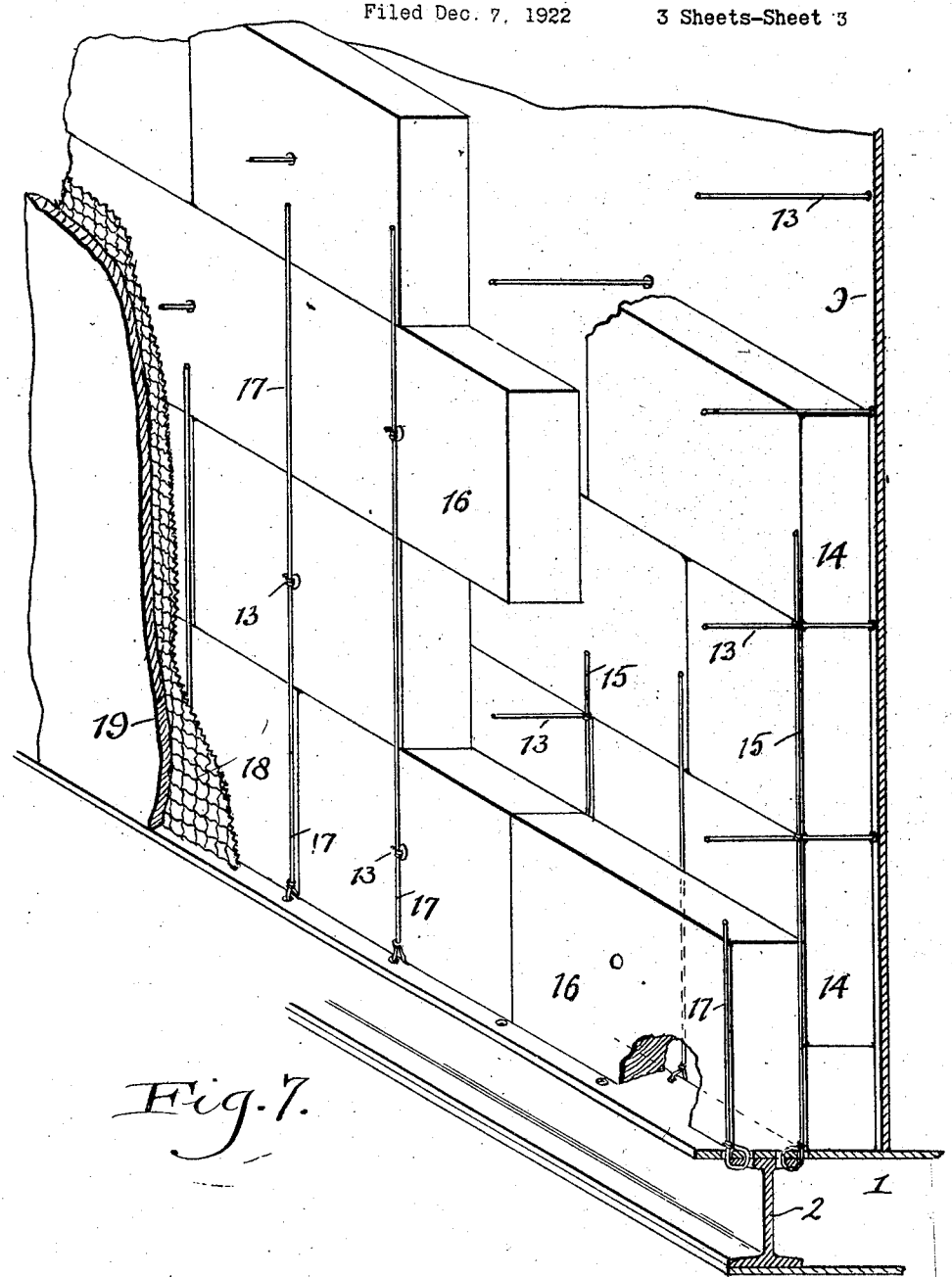

Aug. 3, 1926.  
D. F. DOMIZI  
OVEN STRUCTURE  
Filed Dec. 7, 1922  
1,594,500  
3 Sheets-Sheet 1
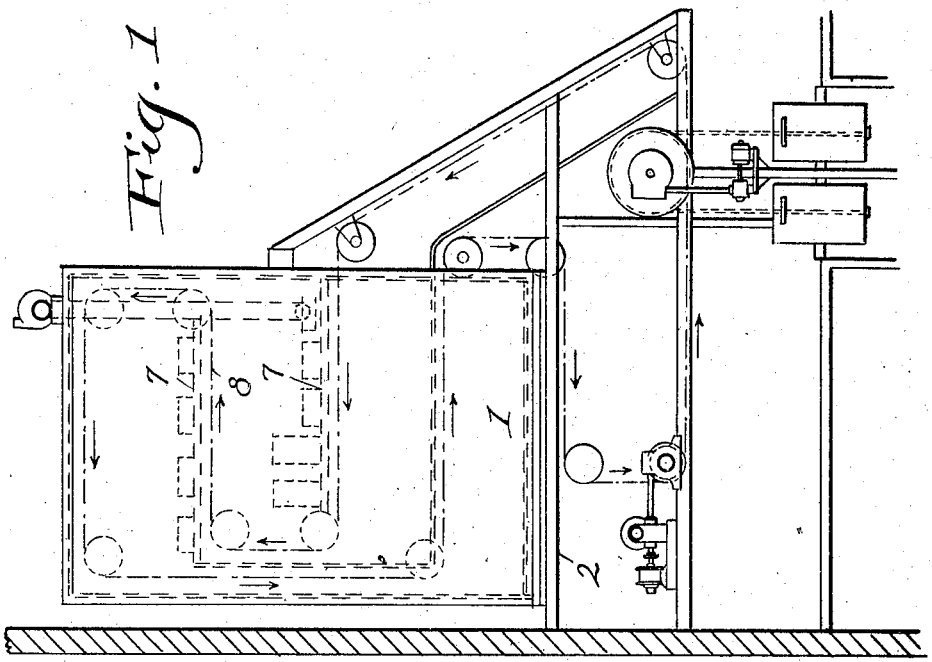
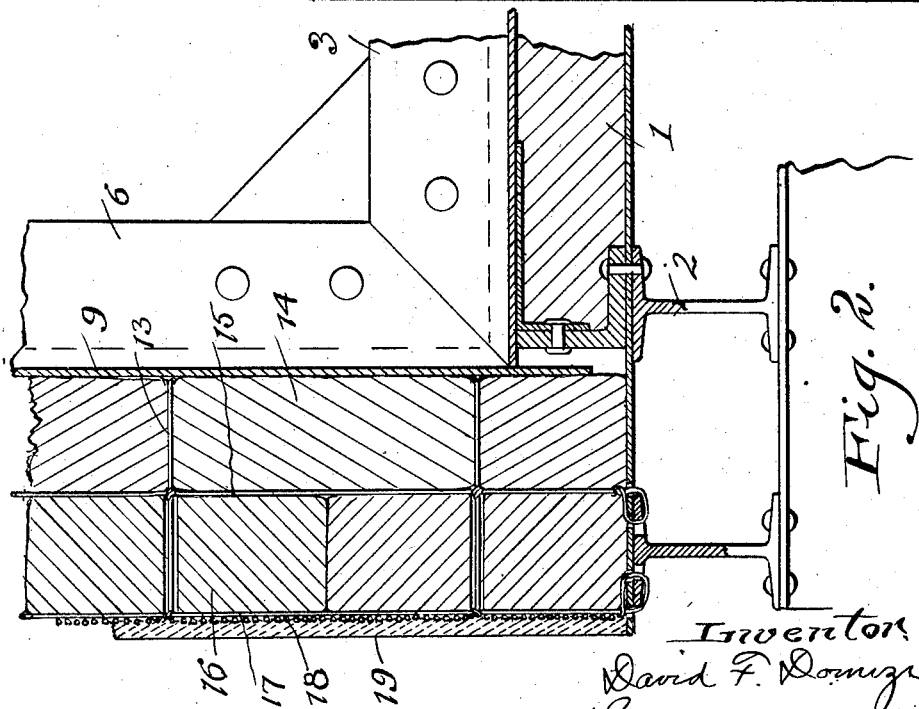
Inventor  
David F. Domizi  
Thurston Kwis + Hudson  
attys.

Aug. 3, 1926.
D. F. DOMIZI
1,594,500
OVEN STRUCTURE
Filed Dec. 7, 1922     3 Sheets-Sheet 2
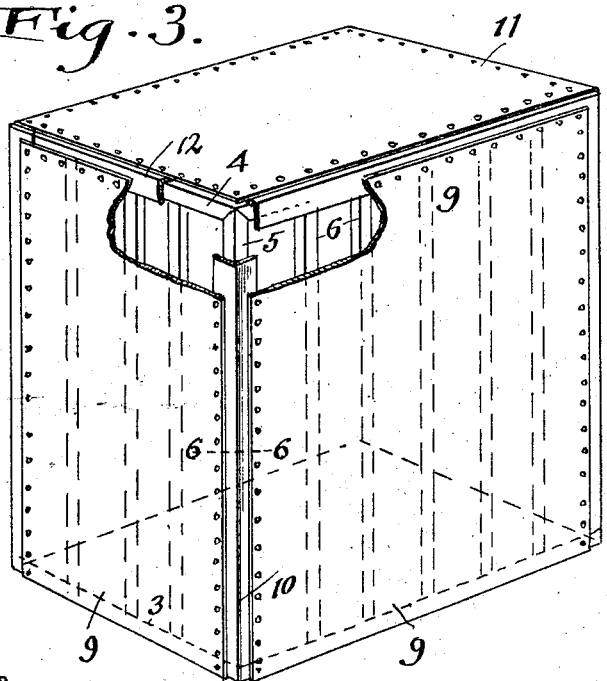
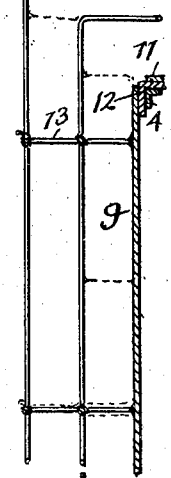
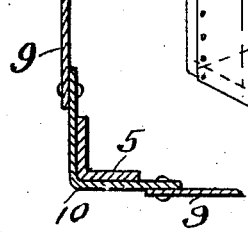
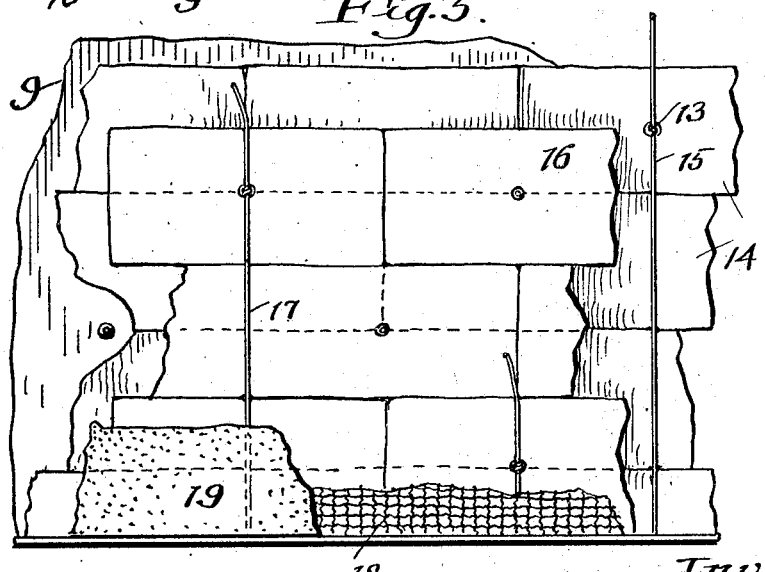
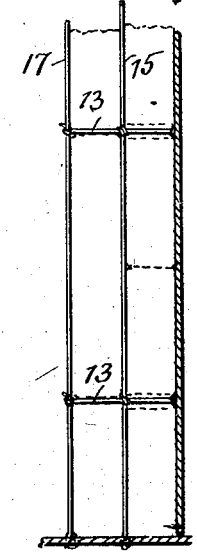

Patented Aug. 3, 1926.

1,594,500

UNITED STATES PATENT OFFICE.

DAVID F. DOMIZI, OF CLEVELAND, OHIO.

OVEN STRUCTURE.

Application filed December 7, 1922. Serial No. 605,535.

This invention relates to ovens or other heated chambers in which it is desirable to prevent the escape of heat or in which it is desirable to avoid distortion of the walls by expansion due to heat.

An object of the invention is to provide an oven structure in which there is very little loss of heat due to conduction or radiation through the walls.

A further object is to provide a heat insulated oven structure in which the oven is perfectly sealed against entrance of dust thereto from the insulating material in the walls thereof.

A further object is to provide an oven structure in which unequal heating of different parts of the oven such as would be caused by a fire in one compartment of the oven would not result in injury of the oven structure and in which excessive distortion due to such heating would be avoided.

A further object is to provide an oven enclosing structure in which joints in the outside wall through which heat is lost and through which dust may enter the oven are eliminated.

A further object is to provide an oven enclosing structure which is of durable construction, which is easy to build and which is inexpensive.

Other objects will be apparent from the following description and annexed drawings.

The following description, together with the accompanying drawings, set forth in detail certain means embodying my invention, the disclosed means, however, constituting but one of the various mechanical forms in which the principal of the invention may be employed.

Reference should be had to the accompanying drawings in which Fig. 1 is a side elevation of a complete oven; Fig. 2 is a fragmentary vertical section through the lower part of a side wall and a portion of the oven bottom; Fig. 3 is a perspective view of the enclosing structure, a portion thereof being broken away to show the oven frame work; Fig. 4 is a vertical section through a side wall of the enclosing structure; Fig. 5 is a fragmentary side elevation of a side wall; Fig. 6 is a section on line 6—6 of Fig. 3; Fig. 7 is an enlarged perspective view showing the wall structure.

Referring to the accompanying drawings, the bottom 1 of the oven is supported upon suitable supporting beams 2 and carries a rigid structural oven frame work which consists of sills 3 and upper rails 4 connected by vertical corner posts 5 and intermediate posts 6. The oven may be of any desired shape suitable for the work for which it is intended but for simplicity has been shown herein as rectangular. The structural oven frame work forms a rigid support for intermediate partitions 7 which may be used to divide the oven into compartments and also for shafts carrying the guide sprockets of an endless conveyor 8 which may be used to convey articles through the oven. The structural frame work of the oven is entirely enclosed by means of a box-like sheet metal casing consisting of side plates 9 riveted to corner angles 10 which are adapted to fit upon the outside of the corner posts 5 of the frame work and a top plate 11 which is riveted to connecting angles 12 interposed between the side plates 9 and the top plate 11. The sheet metal casing is adapted to be lowered over the structural frame work and to be supported thereby with its lower edge overlapping the bottom 1 of the oven. The sheet metal casing, however, is free from attachment to any part of the oven frame work so that the walls and frame work can move relatively to each other when expanded by the heat of the oven. Arranged in rows up the sides and over the top of the sheet metal casing are anchoring wires 13 which have their inner ends secured to the casing preferably by welding. The anchoring wires 13 serve to support the heat insulating covering upon the outside of the sheet metal casing. The heat insulating covering consists of a plurality of layers of heat insulating blocks of a suitable composition to resist the passage of heat. The blocks 14 of the inner layer are arranged with their inner faces against the sheet metal walls of the casing and the anchoring wires 13 are so arranged that they pass between adjacent blocks of the inner layer. Outside the inner layer of blocks 14 are a series of tie-wires 15 which are secured to floor beams at their lower ends and extend up the side walls and over the top of the oven. Each anchoring wire 13 is twisted around a tie-wire 15 on the outer side of the blocks 14. Upon the outer side of the first layer of insulating blocks 14 is a second layer of insulating blocks 16 which are arranged in staggered relation with respect to the blocks of the inner layer and are provided with central openings to receive the anchoring wires 13.

Upon the outside of the blocks 16 are tie-wires 17 corresponding to the tie-wires 15 extending over the inner layer of blocks. The anchoring wires 13 are also twisted around the tie-wires 17. A woven wire fabric 18 suitable for supporting plaster is held upon the outer face of the block 16 by the ends of the anchoring wires 13 which pass through the meshes of the fabric and are bent over to hold the fabric in place. After the blocks and wire fabric has been secured in place upon the sheet metal casing a coating of plaster 19 is applied to the woven wire fabric.

The side and top walls 9 and 11 of the sheet metal casing form a perfect seal for preventing the entrance into the oven of the heat insulating material. In view of the fact that the only metal touching the walls of the sheet metal casing upon the outside are the small anchoring wires 13, there can be very little loss of heat due to conduction and radiation. The sheet metal casing also forms a perfect seal for preventing escape of heated gases from the oven. The sheet metal casing is relatively light and can be easily placed over the oven frame work after which the heat insulating coating can be quickly put in place.

Having described my invention, I claim—

1. An oven structure comprising a structural oven framework, and a separate structure forming the enclosing walls fitting over said framework in engagement therewith, said enclosing walls being free from attachment to said framework whereby relative movements between parts of the framework and walls caused by expansion due to heat are permitted.

2. An oven structure comprising a structural oven framework, and a box-like enclosing structure conforming to the frame work forming the side and top walls of the oven adapted to be slipped over said structural framework and to be supported thereon.

3. An oven structure comprising a structural oven framework, and a box-like enclosing structure forming the side and top walls formed of heat insulating material, said enclosing structure fitting over said framework in engagement therewith but not attached thereto.

4. An oven structure comprising a structural oven framework, a sheet metal box-like casing fitting over said framework in engagement therewith but not attached thereto, and a heat insulating covering upon the outside of said sheet metal casing.

5. An oven structure comprising a structural oven framework, a sheet metal box-like casing fitting over said framework in engagement therewith but not attached thereto, anchoring members carried by said casing and a heat insulating covering secured to said casing by said anchoring members.

6. An oven structure comprising a rectangular angle iron oven framework, and a box-like enclosing structure conforming to the frame work and adapted to be slipped over said framework and to be supported thereon.

7. An oven structure comprising a structural oven framework and a sheet metal box-like casing adapted to be slipped over said framework, said casing comprising vertical angle iron corner members adapted to fit over the corners of the framework, sheet metal side plates secured to said corner members, and a sheet metal plate forming the top of the casing.

8. An oven structure comprising a structural oven framework, a sheet metal box-like casing adapted to be slipped over said framework, said casing being supported by the framework but not attached thereto, anchoring wires welded at one end to said casing and extending outwardly therefrom, a heat insulating covering through which said wires extend, and tie-wires connecting said anchoring wires for holding said covering in place.

9. An oven structure comprising a structural oven framework, a sheet metal box-like casing adapted to be slipped over said framework, said casing being supported by the framework but not attached thereto, anchoring members carried by said casing, a heat insulating covering held in place by said anchoring members, a plaster support upon the outside of the insulating covering of the side walls and a plaster coating carried by said support.

10. An oven structure comprising a structural oven framework, a sheet metal box-like casing adapted to be slipped over said framework, said casing being supported by the framework but not attached thereto, one or more layers of heat insulating blocks upon the outside of said casing, anchoring members carried by said casing for securing said blocks in place, a wire fabric held in place by said anchoring members outside the heat insulating blocks, and a coating of plaster upon said wire fabric.

11. An oven wall comprising a sheet metal plate, a layer of heat insulating blocks upon the outside of said plate, anchoring wires extending through said layer of blocks and secured at their inner ends to said plates, and tie wires extending across the outer face of said layer of blocks and secured to said anchoring wires.

12. An oven wall structure, comprising a sheet metal plate, inner and outer layers of heat insulating blocks carried by the plate, the blocks of said layers being arranged in staggered relation, anchoring wires secured at their inner ends to said plate and extending between certain of the blocks in one layer and through blocks of the other layer, tie wires extending between the layers of blocks and connected to the anchoring wires, and tie wires outside the layers of blocks and connected to the anchoring wires.

13. An oven wall comprising a sheet metal plate, inner and outer layers of heat insulating blocks carried by the plate, tie wires extending over each of said layers, anchoring wires welded at their inner ends to said plate, said anchoring wires extending through the block layers and fastened to the tie wires.

14. An oven wall comprising a sheet metal plate, a heat insulating covering on the outside of said plate, a plaster supporting member upon the outside of said covering, anchoring wires secured at their inner ends to the plate, passing through the heat insulating covering and secured to said plaster supporting member.

15. An oven structure comprising a structural oven framework, a sheet metal casing adapted to be slipped over said framework, a covering of heat insulating blocks over the top and sides of said casing, rows of anchoring wires extending over the sides and top of said casing, said anchoring wires being secured at their inner end to the casing, tie wires outside the heat insulating blocks, said wires extending over the tops and sides of the casing and secured to said anchoring wires.

16. An oven wall comprising a sheet metal plate, a plurality of layers of insulating blocks the blocks of one layer being staggered with respect to the blocks of the adjacent blocks, tie-wires extending along the outside of each layer of blocks, and anchoring wires secured at their inner ends to the plate and extending through the heat insulating layers, said anchoring wires being twisted around the tie wires over each of the layers.

17. An oven structure comprising an oven bottom, a structural oven framework extending upwardly from said bottom, a box-like heat insulating structure fitting over said framework and bottom and forming the sides and top of said oven, said enclosing structure being in engagement with but free from attachment to said oven framework and bottom.

In testimony whereof, I hereunto affix my signature.

DAVID F. DOMIZI.